United States Patent [19]

Toeppen

[11] Patent Number: 5,560,760
[45] Date of Patent: Oct. 1, 1996

[54] METHOD FOR OPTICAL AND MECHANICALLY COUPLING OPTICAL FIBERS

[75] Inventor: John S. Toeppen, Livermore, Calif.

[73] Assignee: The United States of America as represented by the United States Department of Energy, Washington, D.C.

[21] Appl. No.: 321,694

[22] Filed: Oct. 12, 1994

[51] Int. Cl.$^6$ ............................................. C03B 23/20
[52] U.S. Cl. ............................................................. 65/407
[58] Field of Search ............................ 65/407, 501, 390

[56] References Cited

U.S. PATENT DOCUMENTS

| | | | |
|---|---|---|---|
| 3,615,312 | 10/1971 | Landry | 65/390 |
| 4,265,684 | 5/1981 | Jeffery | 65/407 |
| 4,877,303 | 10/1989 | Caldwell | 65/407 |
| 4,883,522 | 11/1989 | Hagerty | 65/39 |
| 5,134,470 | 7/1992 | Ravetti | 65/407 |
| 5,183,489 | 2/1993 | Brehm | 65/407 |

OTHER PUBLICATIONS

"Hoya Laser Glass" Brochure, Aug. 1978, Hoya Corp.
Applied Optics, p. 1284, vol. 20, No. 8, 15 Apr. 1981.
Eickhoff et al, "Optical Fiber Splicing Using Low–Melting Point Glass Solder," 1979, pp. 63–67, Fiber & Integrated Optics vol. 2, No. 1.

Miller, "Optical Fiber Splicing", Feb. 1977, WA3–(1–6) Topical Meeting on Optical Fiber TransMission II.

Primary Examiner—John Hoffmann
Attorney, Agent, or Firm—Robert M. Padilla; William C. Daubenspeck; William R. Moser

[57] ABSTRACT

A method and apparatus for splicing optical fibers. A fluorescing solder glass frit having a melting point lower than the melting point of first and second optical fibers is prepared. The solder glass frit is then attached to the end of the first optical fiber and/or the end of the second optical fiber. The ends of the optical fibers are aligned and placed in close proximity to each other. The solder glass frit is then heated to a temperature which is lower than the melting temperature of the first and second optical fibers, but which is high enough to melt the solder glass frit. A force is applied to the first and second optical fibers pushing the ends of the fibers towards each other. As the solder glass flit becomes molten, the layer of molten solder glass is compressed into a thin layer between the first and second optical fibers. The thin compressed layer of molten solder glass is allowed to cool such that the first and second optical fibers are bonded to each other by the hardened layer of solder glass.

10 Claims, 2 Drawing Sheets

METHOD FOR OPTICAL AND MECHANICALLY COUPLING OPTICAL FIBERS

GOVERNMENT RIGHTS

The United States Government has rights in this invention pursuant to Contract No. W-7405-ENG-48 between the United States Department of Energy and the University of California.

TECHNICAL FIELD

The present invention relates to the field of fiber optics and, more specifically, to the splicing of optical fibers.

BACKGROUND OF THE INVENTION

"Splicing" or joining of optical fibers is a well known and widely practiced technique in the field of fiber optics. Two of the most common methods for splicing standard 125 micron diameter fused silica optical fibers include thermal fusion, and the use of photo-cured adhesive materials. In thermal fusion, adjacent ends of the optical fibers which are to be joined are brought close to each other. The fibers are arranged to insure that the core of the optical fibers, typically having a diameter in the range of 4 microns, are aligned and are coaxial with each other. When the optical fibers are properly aligned, an electric arc is generated between two electrodes. The electrodes are positioned such that the electric arc travels directly between the two optical fibers. Heat generated by the electric arc creates a "melt zone" or uniform softened area of glass at the end of each of the optical fibers. The optical fibers are then pushed or forced towards each other such that the uniformly softened ends of the fibers contact each other. Thus, when the softened glass hardens, the two optical fibers are joined.

Although such a technique is suitable for many applications using standard 125 micron fused silica optical fibers, thermal fusion is not without significant drawbacks. For example, currently available thermal fusion devices are extremely expensive. Portable equipment used, for example by telephone companies, to thermally fuse optical fibers costs, on average, between 50,000 and 100,000 dollars per unit. Furthermore, such equipment is only suitable for standard 125 micron diameter optical fibers. That is, current thermal fusion devices will only splice standard 125 micron optical fibers.

Additionally, even if currently available thermal fusion devices were able to be modified to handle larger diameter optical fibers, the fundamental technique of thermal fusion is not well suited to larger diameter optical fibers. Specifically, as the core diameter of the optical fibers are increased, a much larger melt zone must be created. Consequently, substantially higher current would be necessary to generate sufficient heating. However, as the core diameter increases it is extremely difficult to achieve uniform heating of the end of each optical fiber. That is, thermal fusion techniques can not be easily controlled to generate a large and uniform melt zone.

As an additional drawback, thermal fusion techniques often result in deformation of the host fibers. That is, in thermal fusion the optical fibers to be joined are heated until the ends of the fibers are softened. The softened ends are then pushed or forced together. In so doing, often the ends of the optical fibers are warped or sprayed radially outward resulting in a slightly increased core diameter. This deformation causes light losses and reduces the efficiency of the spliced optical fiber.

Furthermore, the thermal cycling associated with heating and cooling of the optical fibers can cause brittleness to occur within the optical fibers. The introduction of brittleness is especially prevalent in non-fused silica fibers such as, for example, rare earth doped optical fibers.

In optical fiber splicing using photo-cured adhesives, typically a photo-curable plastic, such as a urethane or acrylate resin, is inserted into a capillary tube having a diameter just slightly larger than 125 microns. The optical fibers to be joined are inserted at opposite ends of the capillary tube and are pushed towards each other. The diameter of the capillary tube being only slightly larger than the diameter of the optical fibers insures that the 4 micron cores of the optical fibers are properly aligned. Additionally, because the diameter of the capillary tube is only slightly larger the diameter of the optical fibers, a vent or hole is located in the surface of the capillary tube to allow the escape of air or other gases as the two optical fibers are pushed towards each other.

The optical fibers are forced towards each other such that the photo-curable adhesive material is compressed into a thin layer between the ends of the two optical fibers. The excess photo-curable material is forced out of the vent hole in the capillary tube. The photo-curable material is then exposed to light, typically ultraviolet light to cause, the photo-curable material to harden and bond the optical fibers together.

Like thermal fusion, optical fiber splicing using photo-curable adhesives also has significant drawbacks. Specifically, the photo-curable adhesives are subject to significant thermal and photonic degradation. That is, as the adhesive material is subjected to heat and/or light, the transmissive ability and structural integrity of the adhesive material is reduced. In typical applications, a standard 125 micron fused silica optical fiber transmits power on the order of $1/100$ of a watt. Even at such power levels, photonic and thermal degradation occurs. Thus, in applications where optical fibers having 600–1000 micron core diameters are transmitting power on the order of 100's of watts, photonic and thermal degradation are greatly accelerated. Furthermore, photo-curable adhesives also suffer from degradation as a result of aging even without significant exposure to light or heat. Thus, the use of photo-curable adhesives is limited to low power, low heat, and short term applications.

Therefore a need exists for an inexpensive technique to splice optical fibers which does not cause deformation of the host fibers, does not require repeated thermal cycling of the optical fibers, which is resistant to thermal and photonic degradation even at high power applications, which does not prematurely deteriorate with age, and which is suitable for use with optical fibers having a core diameter of as much as 1000 microns or greater.

SUMMARY OF THE INVENTION

It is therefore an object of the present invention to provide an inexpensive technique to splice optical fibers which does not cause deformation of the host fibers, does not require repeated thermal cycling of the optical fibers, which is resistant to thermal and photonic degradation even at high power applications, which does not prematurely deteriorate with age, and which is suitable for use with optical fibers having a core diameter of as much as 1000 microns or greater. This object has been accomplished by a splicing technique in which a solder glass flit having a melting point lower than the melting point of the optical fibers is used to splice the two optical fibers together.

In one embodiment, a solder glass flit having a melting point lower than the melting point of first and second optical fibers is prepared. The solder glass flit is then attached to the end of the first optical fiber and/or the end of the second optical fiber. The ends of the optical fibers are aligned and placed in close proximity to each other. The solder glass flit is then heated to a temperature which is lower than the melting temperature of the first and second optical fibers, but which is high enough to melt the solder glass flit. A force is applied to the optical fibers pushing the ends of the fibers towards each other. As the solder glass flit becomes molten, the layer of molten solder glass is compressed into a thin layer between the first and second optical fibers. The thin compressed layer of molten solder glass is allowed to cool such that the first and second optical fibers are bonded to each other by the hardened layer of solder glass.

In another embodiment, a solder glass flit having a melting point lower than the melting point of the optical fibers to be bonded is prepared and inserted into a vented capillary tube. The optical fibers are then inserted at opposite ends of the capillary tube and pushed towards each other such that solder glass flit is placed between the ends of the optical fibers. The solder glass flit is then heated until it becomes molten. As the solder glass flit becomes molten, the layer of molten solder glass is compressed into a thin layer between the optical fibers. The thin compressed layer of molten solder glass is allowed to cool such that the optical fibers are bonded to each other by the hardened layer of solder glass.

In so doing, the present claimed invention eliminates the use of easily degraded photo-cured adhesives, and further eliminates the need to form a melt zone on the ends of the optical fibers. As a result the present claimed invention provides an optical fiber splicing technique which does not cause deformation of the host fibers and does not require repeated thermal cycling of the optical fibers. Furthermore, the solder glass of the present claimed invention is resistant to thermal and photonic degradation even at high power applications, does not prematurely deteriorate with age. Additionally, the optical fiber splicing technique of the present invention is suitable for use with optical fibers having a core diameter of as much as 1000 microns or greater.

BRIEF DESCRIPTION OF THE DRAWINGS

The accompanying drawings which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
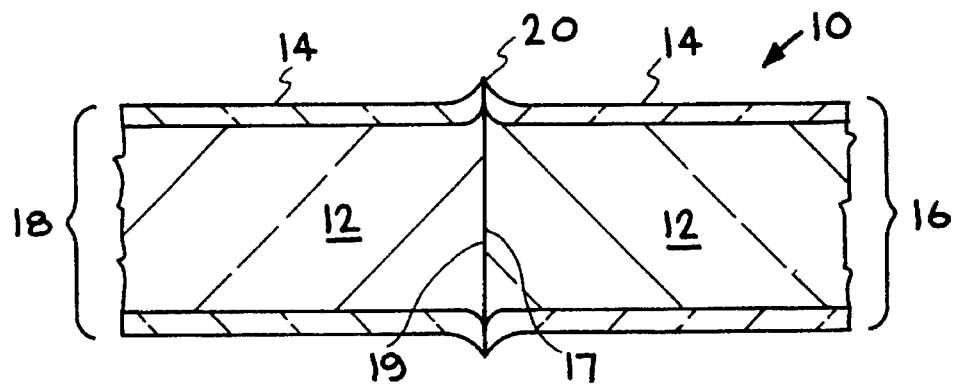
FIG. 1 is a cut-away side view of a portion of an optical fiber which has been spliced using conventional thermal fusion.

With reference now to Prior Art FIG. 1, an optical fiber 10 which has been spliced using conventional thermal fusion is shown. Spliced optical fiber 10 is formed of a standard 125 micron fused silica fiber having a core 12 with a diameter of 4 microns (The core is enlarged for detail in Prior Art FIG. 1). The core 12 of spliced optical fiber 10 is surrounded by cladding 14. Spliced optical fiber 10 is formed of two separate optical fibers 16 and 18 whose ends 17 and 19, respectively, are spliced together or joined at bond 20.

The thermal fusion technique requires that ends 17 and 19 of optical fibers 16 and 18 be heated until ends 17 and 19 become molten or softened. Optical fibers 16 and 18 are then pushed together such that a bond 20 is created between optical fibers 16 and 18. As shown in Prior Art FIG. 1, the heating and forcing together of ends 17 and 19 of optical fibers 16 and 18 warps or sprays ends 17 and 19 radially outward resulting in a slightly increased core diameter. This deformation causes light losses and reduces the efficiency of spliced optical fiber 10.

Figure 2:
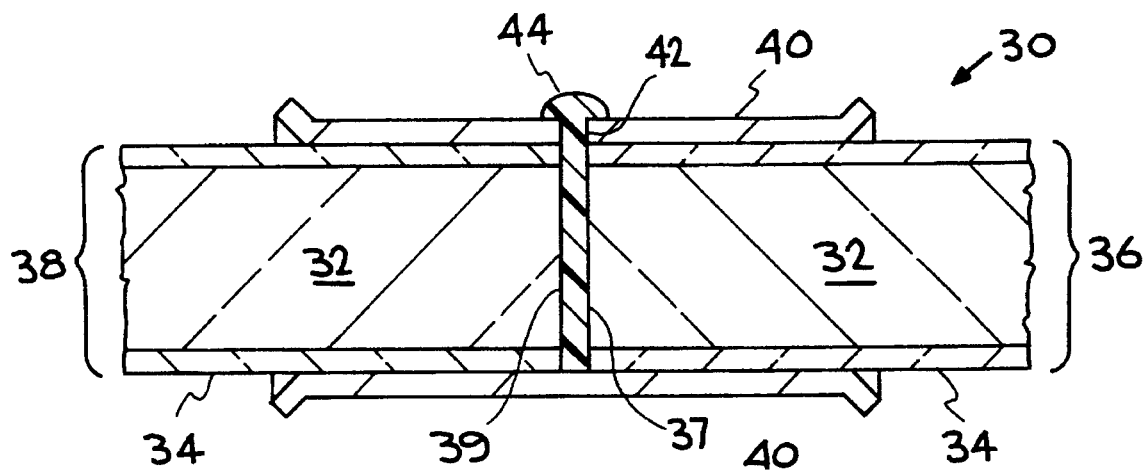
FIG. 2 is a cut-away side view of a portion of an optical fiber which has been spliced using conventional photo-curable adhesives.

With reference next to Prior Art FIG. 2, an optical fiber 30 which has been spliced using conventional photo-curable adhesives is shown. In shown in Prior Art FIG. 1, spliced optical fiber 30 is a standard 125 micron fused silica fiber having a core 32 with a diameter of 4 microns (The core is enlarged for detail in Prior Art FIG. 2). The core 32 of spliced optical fiber 30 is surrounded by cladding 34. The spliced optical fiber 30 is formed of two separate optical fibers 36 and 38 whose ends 37 and 39, respectively, are inserted into a capillary tube 40. Capillary tube 40 has a vent hole 42 formed in the surface thereof. Thus, as ends 37 and 39, respectively, of optical fibers 36 and 38 are inserted into capillary tube 40 and are pushed towards each other, excess photo-curable adhesive material 44 is forced out of vent hole 42. By exposing photo-curable adhesive material to light and thereby hardening the material, optical fibers 36 and 38 are bonded or spliced together.

However, the photo-curable material located between ends 37 and 39 of optical fibers 36 and 38 degrades over time and with exposure to light and heat. Therefore, the use of photo-curable adhesive material is not suitable for high power or long term applications.

Figure 3:
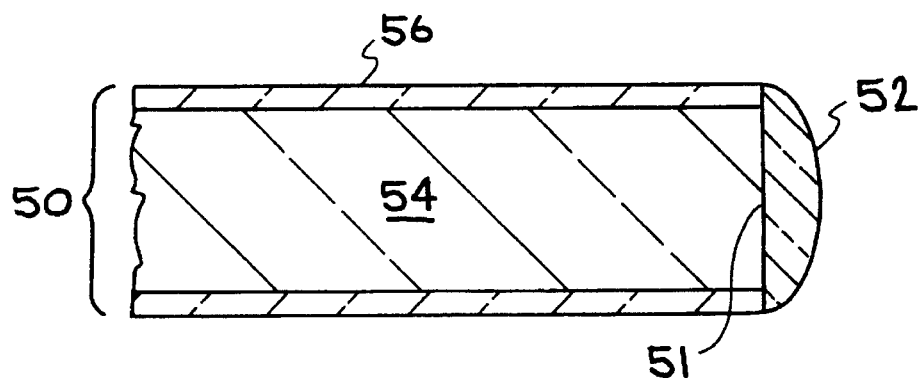
FIG. 3 is a cut-away side view of an optical fiber having a thin coating of a solder glass attached to the end thereof in accordance with the present invention.

Referring now to FIG. 3, an optical fiber 50 having a thin coating of a solder glass 52 attached to the end thereof is shown. Optical fiber 50 has a core 54 with a diameter 1000 microns. A cladding 56 having a diameter of approximately 10 microns surrounds core 54. Although the present invention, unlike the prior art, is well suited to numerous sizes of optical fibers, including optical fibers with core diameters in excess of 1000 microns, the present invention is also well suited to use with standard 125 micron diameter optical fibers.

With reference still to FIG. 3, in the present embodiment, solder glass 50 is formed of a low melting point glass, such as, for example, Schott. FK-3 glass manufactured by Schott Glass Technologies, Inc., of Duryea, Pa. Although such a glass is used in the present embodiment, the present claimed invention is also well suited to the use of other types of low melting point glasses. In the present embodiment, the solder glass has a melting point of approximately 400 degrees centigrade. Thus, the melting point of the solder glass is much lower than the approximate 1200 degree melting point of fused silica optical fibers.

Referring still to FIG. 3, in one embodiment of the present invention, the low melting point solder glass is prepared into a flit. Next, the end 51 of optical fiber 50 is heated to a temperature which is greater than the melting point of the solder glass flit, but which is less than the melting point of optical fiber 50. Although a fused silica optical fiber having a melting point of approximately 1200 degrees centigrade is used in the present embodiment, the present invention is also well suited to the use of other types of optical fibers, including non-fused silica optical fibers, having different melting points. After end 51 of optical fiber 50 is heated, end 51 is dipped into or otherwise brought into contact with the low melting point solder glass flit. Because end 51 is heated to a temperature greater than the melting point of the solder glass flit, end 51 is wetted by the low melting point solder glass. Alternately, the present invention is also well suited to having the solder glass frit heated until it becomes molten and then bringing the unheated end 51 of optical fiber 50 into contact with the molten solder glass. In so doing, end 51 of optical fiber 50 is wetted by the low melting point solder glass 52.

Figure 4:
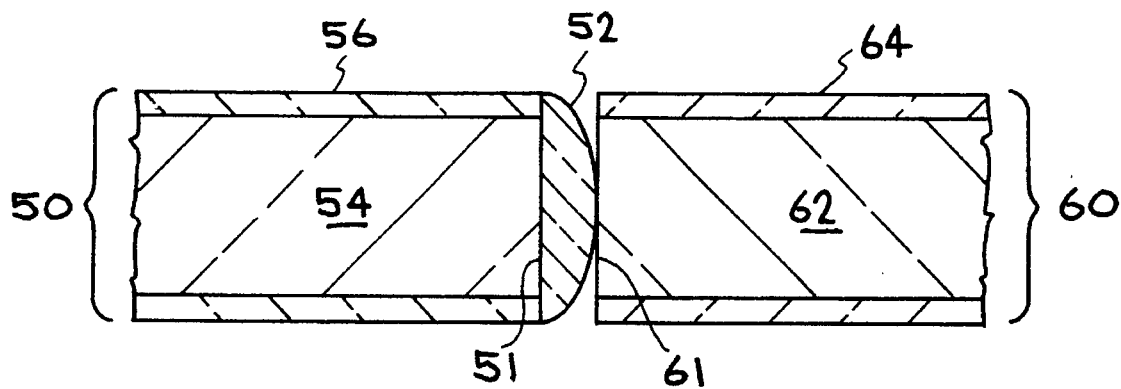
FIG. 4 is a cut-away side view of a two aligned optical fibers having a thin coating of a solder glass disposed therebetween in accordance with the present invention.

With reference next to FIG. 4, the end 61 of an optical fiber 60 is aligned with end 51 of optical fiber 50. The alignment of the two optical fibers is achieved in the present invention using clamps, not shown, which, hold ends 51 and 61 of optical fibers in proper alignment. Additionally, an upset force generated, for example, by a spring mechanism, not shown, is used to push or force ends 51 and 61 towards each other. In the present embodiment, only optical fiber 50 has a coating of solder glass 52 attached to the end thereof. However, the present claimed invention is also well suited to coating both ends 51 and 61 of the optical fibers to be spliced together with solder glass 52.

Referring still to FIG. 4, solder glass 52 is heated until it becomes molten. In the present embodiment the heating of solder glass 52 is accomplished through slow heating in an oven. In so doing, the ambient temperature of the oven is gradually raised to a temperature which melts solder glass 52 but which does not melt optical fibers 50 and 60. In the present invention, slow oven heating is used to melt solder glass 52. However, the present claimed invention is also well suited to numerous other types of heating such as, for example, generating an electric arc in close proximity to solder glass 52 such that the heat generated by the electric arc causes the solder glass to become molten. Alternately, solder glass 52 can be heated in an oven to a temperature near the melting point of solder glass 52, and then an electric arc can be generated which will generate sufficient additional heat to cause solder glass 52 to become molten. However, in all types of heating, only solder glass 52 is melted. That is, unlike prior art splicing techniques such as thermal fusion, the present invention does not melt the optical fibers which are to be joined. In the present invention, only the solder glass is heated to a temperature at or above its melting point. As a result, the present invention does not cause significant dimensional change or deformation of the host optical fibers. Additionally, by eliminating the extreme thermal cycling found in the prior art, the present invention does not render optical fibers 50 and 60 brittle.

With reference still to FIG. 4, the solder glass frit is formed solely of low melting point glass such as, for example FK-3 glass, in the present embodiment. However, in another embodiment of the present invention the solder glass flit may be formed of a composite of low melting point glass and the material which forms the optical fibers to be spliced such as, for example, fused silica. By varying the ratio of fused silica to low melting point glass within the solder glass frit, the melting point of the solder glass flit is adjusted to a melting point nearer to the melting point of the fused silica optical fibers. In so doing, the coefficient of thermal expansion of the solder glass flit is also closely matched to the coefficient of thermal expansion of the optical fibers to be spliced. As a result, the bond formed by the solder glass is not subjected to significant deleterious stress during temperature fluctuations. Therefore, the bond formed by the solder glass achieves even greater long term thermal stability and reliability.

With reference still to FIG. 4, in addition to adjusting the composition of the solder glass to obtain a desired coefficient of thermal expansion, fluorescing material can also be added to the solder glass flit mixture. In so doing, the amount or type of light passing through the spliced optical fiber can be quantitatively monitored as a function of the fluorescence given off at the point where the two optical fibers are joined.

Referring still to FIG. 4, as an additional benefit of the present claimed invention, the low melting point glass of the solder glass flit has an index of refraction of approximately equal to the index of refraction of fused silica, i.e. 1.46. Thus, solder glass 52 provides a good optical match to cores 54 and 62 of optical fibers 50 and 60, respectively.

Figure 5:
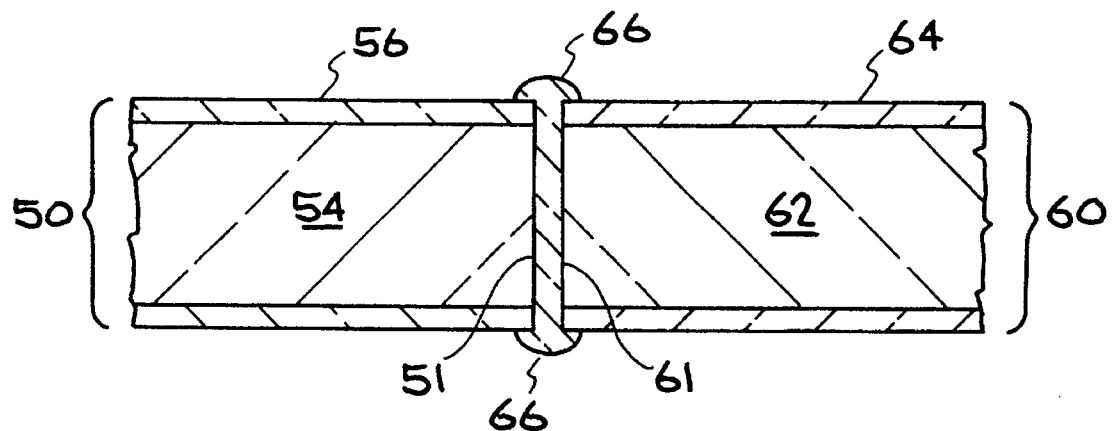
FIG. 5 is a cut-away side view of a two bonded optical fibers wherein excess solder glass is forced from therebetween in accordance with the present invention.

With reference still to FIG. 4, the upset force applied to optical fibers 50 and 60 causes ends 51 and 61 to be pushed close to each other as solder glass 52 becomes molten. As ends 51 and 61 are forced close together, the molten solder glass 52 is compressed into a thin layer between ends 51 and 61. Any excess molten solder glass 66 is pushed outside of the edges of ends 51 and 61 of optical fiber 50 and 60 as shown in FIG. 5. As the molten solder glass is allowed to cool and harden, optical fibers 50 and 60 are spliced together by a thin layer of solder glass. Thus, the present invention splices optical fibers 50 and 60 together without melting or deforming ends 51 and 61. Furthermore, the present claimed invention does not expose optical fibers 50 and 60 to the extreme temperatures associated with, for example, thermal fusion.

Figure 6:
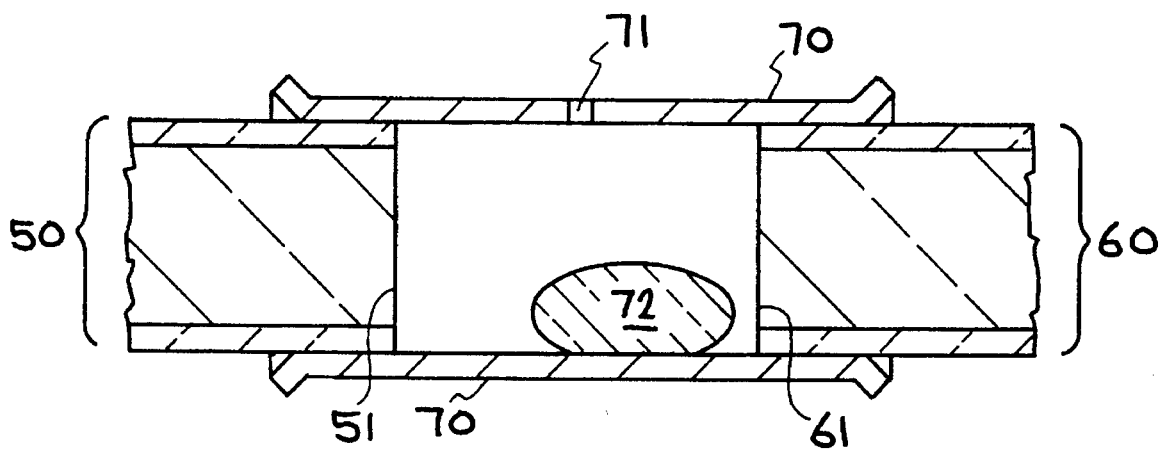
FIG. 6 is a cut-away side view of an alternate embodiment of the present splicing invention in accordance with the present invention.

Referring next to FIG. 6, another embodiment of the present invention is shown in which ends 51 and 61 of optical fibers 50 and 60 are inserted into a vented capillary tube 70 having low melting point solder glass frit 72 placed therein. Alternately, the solder glass flit could be attached to one or both of ends 51 and 61. In the present embodiment, vented capillary tube 70 is formed of ceramic. Alternately, vented capillary tube 70 may also be formed of other materials such as, for example, metal or glass.

With reference again to FIG. 6, for a standard 125 micron fused silica optical fiber, the amount of solder glass 72 placed into vented capillary tube 70 is as small as a grain of sand. Although such an amount is used in the present embodiment, the present invention is well suited to using different amounts of solder glass.

Referring still to FIG. 6, ends 51 and 61 of optical fibers 50 and 60 are inscribed such that they are near vent hole 71 of capillary tube 70. In so doing, when solder glass 72 is heated as described above in conjunction with FIGS. 3–5, excess solder glass is expelled through vent hole 71. After solder glass 72 has hardened and optical fibers 50 and 60 are spliced together, vented capillary tube 70 is either left in place for structural support or is removed as desired.

Thus, the present invention, which uses of a low melting point glass such as FK-3, is advantageous over the prior art for several reasons. Unlike photo-curable adhesive materials, low melting point glass exhibits long term stability. That is, the low melting point solder glass does not age or yellow after a relatively brief period as do the photo-curable adhesives. Additionally, the low melting point solder glass used in the present invention has a high damage threshold. That is, the solder glass used in the present invention does not suffer from photonic degradation when high power light energy is passed through the solder glass. In optical fibers spliced with prior art photo-curable adhesives, even when transmitting power on the order of 1/100 of a watt photonic and thermal degradation occurs. However, the low melting point solder glass used in the present invention does not suffer from such photonic degradation and is well suited for use in applications where optical fibers having 600–1000 micron core diameters are transmitting power on the order of 100's of watts. Although the low melting point solder glass may be used as set forth in the present invention with optical fibers having a core diameter in excess of 1000 microns, the low melting point solder glass used is also well suited for use with standard 125 micron optical fibers having a 4 micron core diameter.

Additionally, the present claimed invention is also well suited to use with either single or multimode optical fibers. The present claimed invention is also much less expensive to practice than thermal fission techniques which require equipment costing as much as 50,000 to 100,000 dollars a unit. Furthermore, low melting point glass has an ease of workability which is not found in prior art materials such as photo-curable adhesives.

Therefore, the present claimed invention eliminates the use of easily degraded photo-cured adhesives, and further eliminates the need to form a melt zone on the ends of the optical fibers. As a result the present claimed invention provides an optical fiber splicing technique which does not cause deformation of the host fibers and does not require repeated thermal cycling of the optical fibers. Furthermore, the solder glass of the present claimed invention is resistant to thermal and photonic degradation even at high power applications, does not prematurely deteriorate with age. Additionally, the optical fiber splicing technique of the present invention is suitable for use with optical fibers having a core diameter of as much as 1000 microns or greater.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A method for optically and mechanically coupling optical fibers, each having an end to be coupled, comprising the steps of:

forming a solder glass frit which will, fluoresce when light passes there-through by mixing a fluorescing material into said solder glass frit;

heating said solder glass frit having a melting point lower than the melting point of said optical fibers such that said solder glass frit becomes molten solder glass;

moving said end of a first of said optical fibers toward said end of a second of said optical fibers such that said ends are aligned and the molten solder glass is compressed to form a thin layer between said ends; and cooling said molten layer of solder glass until hardened such that said ends of said optical fibers are optically and mechanically coupled by said thin layer of hardened solder glass.

2. The optical and mechanical coupling method recited in claim 1 further comprising the step of:

forming said solder glass frit from a glass material having an index of refraction closely matching the index of refraction of the cores of said optical fibers.

3. The optical and mechanical coupling method recited in claim 1 further comprising the step of:

forming said solder glass frit having a coefficient of thermal expansion closely matching the coefficient of thermal expansion of the cores of said optical fibers by mixing a glass material with fused silica.

4. The optical and mechanical coupling method recited in claim 1 wherein each of said optical fibers have a diameter in the range of 600–1000 microns.

5. The optical and mechanical coupling method recited in claim 1 wherein the step of moving said end of a first of said optical fibers toward said end of a second of said optical fibers such that said ends are aligned and the molten solder glass is compressed to form a thin layer between said ends further comprises the steps of:

inserting said first end of said first of said optical fibers into a first end of a vented capillary tube having a surface which form a vent hole such that said first end of said first of said optical fibers is disposed proximate to said vent hole in the surface of said vented capillary tube; and inserting said second end of said second of said optical fibers into a second end of said vented capillary tube such that said second end of said second of said optical fibers is disposed proximate to said first end of said first of said optical fibers and said vent hole in said surface of said vented capillary tube.

6. The optical and mechanical coupling method recited in claim 5 wherein the first inserting step further comprises the step of inserting said first end of said first of said optical fibers into a first end of a vented capillary tube made from a material selected from a group consisting of ceramic, glass and metal, such that said first end of said first of said optical fibers is disposed proximate to a vent hole in the surface of said vented capillary tube.

7. The optical and mechanical coupling method recited in claim 1 wherein the step of heating said solder glass frit further comprises:

generating an electric arc in close proximity to said solder glass frit such that heat generated by said electric arc causes said solder glass frit to become molten.

8. The optical and mechanical coupling method recited in claim 1 wherein the step of heating said solder glass frit comprises the following steps:

raising the ambient temperature in an area surrounding said solder glass frit to a temperature near the melting point of said solder glass frit; and generating an electric arc in close proximity to said solder glass frit such that heat generated by said electric arc causes said solder glass frit to become molten.

9. The optical and mechanical coupling method recited in claim 1 comprising, prior to said step of heating said solder glass frit, the following steps:

inserting said solder glass frit into a vented capillary tube having a surface which forms a vent hole, said solder glass frit inserted into said vented capillary tube such that said solder glass flit is disposed proximate to said vent hole in said surface of said vented capillary tube;

inserting said first end of said first of said optical fibers into a first end of a vented capillary tube such that said first end of said first of said optical fibers is disposed proximate to said vent hole in the surface of said vented capillary tube; and inserting said second end of said second of said optical fibers into a second end of said vented capillary tube such that said second end of said second of said optical fibers is disposed proximate to said first end of said first of said optical fibers and said vent hole in said surface of said vented capillary tube.

10. The optical and mechanical coupling method recited in claim 1 wherein the step of forming a solder glass frit which will fluoresce when light passes there through by mixing a fluorescing material into said solder glass frit further comprises forming said solder glass frit which will fluoresce when a particular type of light passes there through by mixing a fluorescing material into said solder glass frit.

* * * * *